US006801687B2

(12) United States Patent
Pierce

(10) Patent No.: US 6,801,687 B2
(45) Date of Patent: Oct. 5, 2004

(54) APPARATUS AND METHOD FOR GENERATING A MODE-SCRAMBLED OPTICAL SIGNAL USING A VCSEL ARRAY

(75) Inventor: Robert M. Pierce, Woodinville, WA (US)

(73) Assignee: Terabeam Corporation, Redmond, WA (US)

( * ) Notice: Subject to any disclaimer, the term of this patent is extended or adjusted under 35 U.S.C. 154(b) by 78 days.

(21) Appl. No.: 10/226,490

(22) Filed: Aug. 22, 2002

(65) Prior Publication Data

US 2004/0037496 A1 Feb. 26, 2004

(51) Int. Cl.[7] .............................. G02B 6/26; G02B 6/42; G02B 6/36; H04B 10/00; H04B 10/12
(52) U.S. Cl. .............................. 385/28; 385/33; 385/89; 398/130; 398/142
(58) Field of Search .............................. 385/27–29, 31, 385/33–35, 38, 39, 88, 92; 398/90, 96, 130, 142

(56) References Cited

U.S. PATENT DOCUMENTS

| 4,229,067 | A | * | 10/1980 | Love ........................... 385/28 |
| 5,077,815 | A | * | 12/1991 | Yoshizawa et al. ........... 385/28 |
| 6,061,133 | A | * | 5/2000 | Freischlad .................. 356/460 |
| 6,295,161 | B1 | * | 9/2001 | Bazzocchi ............... 359/341.33 |
| 6,392,256 | B1 | * | 5/2002 | Scott et al. .................. 257/184 |
| 6,542,672 | B2 | * | 4/2003 | Jewell et al. ................. 385/49 |
| 6,674,941 | B2 | * | 1/2004 | Tatum et al. ................. 385/33 |
| 2002/0126479 | A1 | * | 9/2002 | Zhai et al. .................. 362/244 |
| 2003/0021327 | A1 | * | 1/2003 | Murry ......................... 372/96 |
| 2003/0072053 | A1 | * | 4/2003 | Weaver et al. ............. 359/124 |

* cited by examiner

Primary Examiner—Edward J. Glick
Assistant Examiner—Thomas R Artman
(74) Attorney, Agent, or Firm—Blakely Sokoloff Taylor & Zafman LLP

(57) ABSTRACT

An apparatus and method for generating a mode-scrambled optical signal using a VCSEL array. An array of vertical cavity surface-emitting lasers (VCSELs) are employed to generate respective of optical signals comprising modulated laser beams that are optically coupled into an input end of a multimode fiber segment. In one embodiment, the optical signals are offset-launched into the multimode fiber. As the respective optical signals pass through the segment of multimode fiber, they are combined to produce a mode-scrambled optical signal having a substantially-filled numerical aperture that is emitted from the output end of the fiber. In accordance with one aspect of the invention, the apparatus enables multiple optical beams having similar wavelengths to be combined to increase optical signal strength. In accordance with another aspect, one portion of the VCSELs may be initially activated, while another portion is used as spares that may be selectively activated to replace any activated VCSELs that fail.

21 Claims, 6 Drawing Sheets

APPARATUS AND METHOD FOR GENERATING A MODE-SCRAMBLED OPTICAL SIGNAL USING A VCSEL ARRAY

BACKGROUND OF THE INVENTION

1. Field of the Invention

The present invention generally relates to free-space optical communications systems (FSOCS), and, more specifically, to an apparatus and method for generating a mode-scrambled optical signal using a VCSEL array suitable for use in FSOCSs.

2. Background Information

With the increasing popularity of wide area networks (WANs), such as the Internet and/or the World Wide Web, network growth and traffic has exploded in recent years. Network users continue to demand faster networks and more access for both businesses and consumers. As network demands continue to increase, existing network infrastructures and technologies are reaching their limits.

An alternative to present day hardwired or fiber network solutions is the use of wireless optical communications. Wireless optical communications utilize point-to-point communications through free-space and therefore do not require the routing of cables or fibers between locations. Wireless optical communications are also known as free-space optical (FSO) or atmospheric optical communications. In a typical free-space optical communication system, a modulated beam of light is directed through free-space from a transmitter at a first location to a receiver at a second location. Data or information is encoded into the beam of light by means of the modulation. Once collected by the receiver, the modulated beam of light is demodulated and corresponding data and information may then be extracted. This scheme enables data and information to be transmitted through free-space from the first location to the second location.

Transmission of optical signals through free space poses many challenges. Notably, atmospheric conditions can greatly degrade signal strength and link distances. When launching a single-mode beam from a free-space optical terminal, atmospheric scintillation and other wavefront distortion cause the beam to break up into chaotic bright and dark spots. The received signal may have a large fluctuation if the collector size is comparable to the size of the bright and dark spots.

One technique that is used to address these problems is to "scramble" the optical beam, thereby creating a multitude of randomized signals rather than a single mode signal. Mode scrambling may be performed using various techniques and apparatus that are well-known in the art. For example, mechanical mode scramblers have long been used to generate a multimode optical signal. A single mode optical signal is launched from a single mode optical fiber into a multimode optical fiber. The multimode optical fiber is placed in the mode scrambler, which has corrugated surfaces to provide micro-bends in the optical fiber and redistribute energy into all the modes in the multimode optical fiber, resulting in the desired overfilled launch condition. The mechanical mode scrambler physically bends the optical fiber such that the angle of reflection between the optical signal and the core/cladding interface will be altered as the single mode optical signal passes through the portion of the optical fiber being bent. In this way, the single mode launch optical signal will be coupled into many more modes to approximate an overfilled power distribution in the multimode optical fiber. One such mechanical mode scrambler is the FM-1 Mode Scrambler available from Newport Corporation in Irvine, Calif.

Despite the advantages, this type of mode scrambler imposes intolerable strain on the optical fiber when physically bending the optical fiber to alter the angle of reflection. The micro-bending stretches one side of the optical fiber and compresses the other. Because most optical fibers are comprised of glass or plastic, any strain on the optical fibers increases the risk that they will break. Tight bends in optical fiber can cause cracks, which can affect the optical signal traveling through the optical fiber, and will eventually lead to breakage of the optical fiber. A broken or cracked optical fiber will not properly transmit an optical signal.

In addition to problems with optical fiber damage, the characteristics of the scrambled signals produced by conventional mode scrambling techniques are less than optimal. Significantly, the power intensity distribution (i.e., relative intensity vs. angle) of the signal may be asymmetrically skewed and/or peaked, and the numerical aperture is only partially filled. These potentially may lead to substantial signal losses, which may result in erroneous and/or lost data. In addition, mechanical mode scrambling tends to be excessively lossy, reducing the efficiency of the fiber connection.

SUMMARY OF THE INVENTION

The present invention provides an apparatus and method for generating a mode-scrambled optical signal using a VCSEL array. An array of vertical cavity surface-emitting lasers (VCSELs) are employed to generate respective of optical signals comprising modulated laser beams that are optically coupled into an input end of a multimode fiber segment. In one embodiment, the optical signals are offset-launched into the multimode fiber. As the respective optical signals pass through the segment of multimode fiber, they are combined to produce a mode-scrambled optical signal having a substantially-filled numerical aperture that is emitted from the output end of the fiber. A portion of the multimode fiber may be configured as a series of alternating loops to improve the quality of the signal.

In accordance with one aspect of the invention, the apparatus enables multiple optical beams having similar wavelengths to be combined to increase optical signal strength. In accordance with another aspect, one portion of the VCSELs may be initially activated, while another portion is used as spares that may be selectively activated to replace any activated VCSELs that fail.

In accordance with yet another aspect of the invention, the mode-scrambled optical signal produced by the apparatus has a two-dimensional intensity-distribution profile that resembles a "top hat." Such an intensity distribution enables a more powerful signal to be generated when compared with prior-art optical signals that do not have top hat intensity-distribution profiles.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

Figure 1:
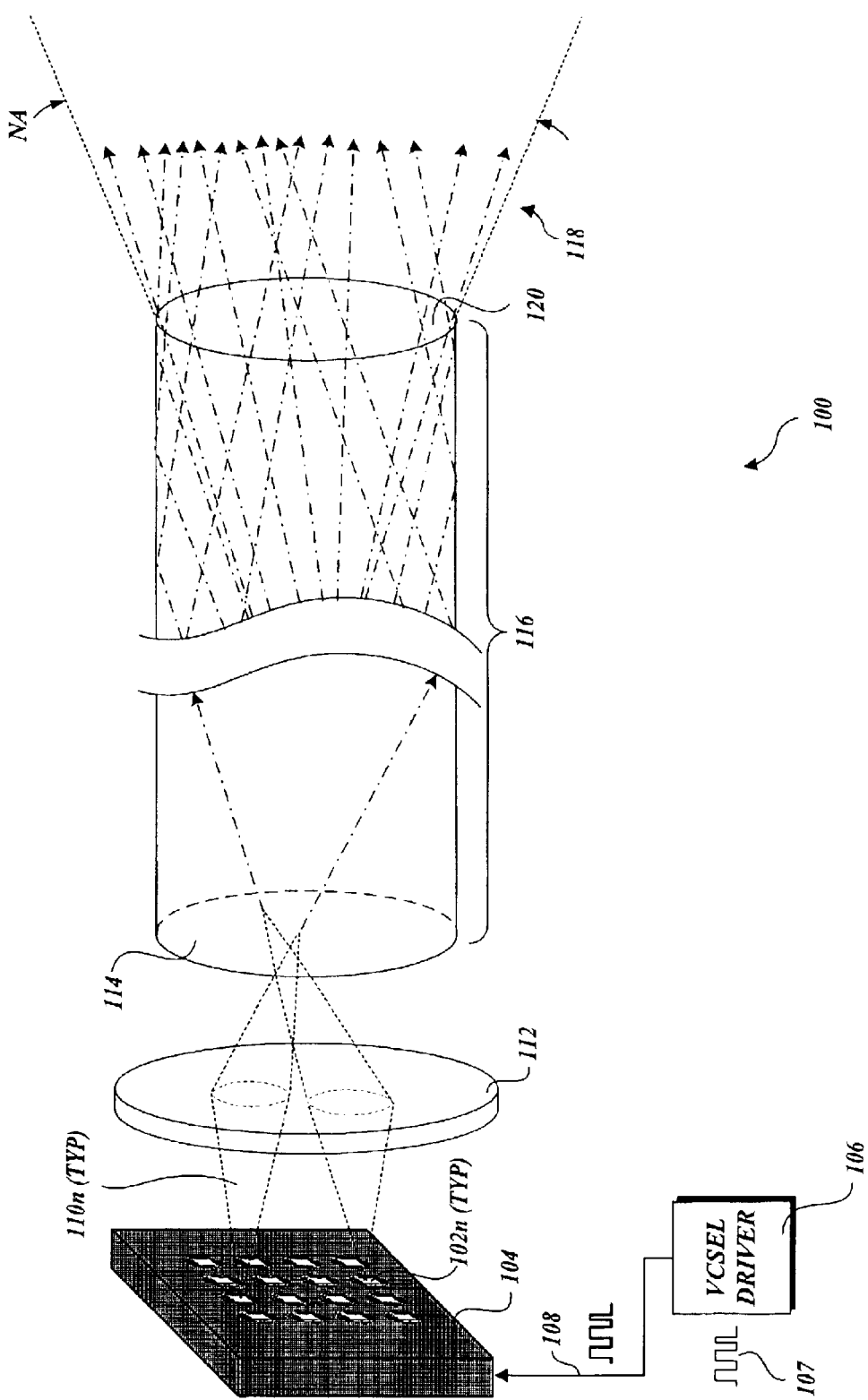
FIG. 1 is a schematic drawing of an apparatus for producing a mode-scrambled optical signal by combining a plurality of redundant optical signals generated by an array of VCSELs in accordance with one embodiment of the invention.

Embodiments of an apparatus and method for generating mode-scrambled optical signals using VCSEL arrays are described herein. In the following description, numerous specific details are disclosed to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the following paragraphs various embodiments of the invention are described with reference to the Figures contained herein. In general, components having the same base reference numerals in the Figures provide similar operations in each embodiment in which they are used. Additionally, as used herein, the term "fiber" will generally refer to optical fiber, and the terms fiber and optical fiber are used interchangeably.

In accordance with one aspect of the invention, various configurations are disclosed herein that enable a plurality of redundant optical signals to be combined into a single signal and transmitted to a receiving terminal via an FSO link.

According to one aspect of the invention, an array of high-speed vertical cavity surface-emitting lasers (VCSELs) may be implemented as respective laser beam sources that generate modulated laser beams that are launched into a fiber core. Generally, VCSELs are available in individual packages, or packaged in an array. One advantage of VCSEL arrays is that they are manufactured using fabricated wafers that are made using processing that is similar to that used for manufacturing integrated circuit components. As a result, VCSELs exhibit very predictable performance characteristics. VCSELs may also be tested while on the original wafer, unlike ordinary laser diodes, which typically must be diced, mounted and wire bonded before they can be tested. The end result is an overall savings in manufacturing cost.

Details of an embodiment of a mode-scrambled optical signal generator 100 are illustrated in FIG. 1, which includes a plurality of VCSELs 102n in a VCSEL array 104 that are driven by a VCSEL driver 106. VCSEL driver 106 receives a modulated input signal 107 in which data are encoded. In response to receiving input signal 107, the VCSEL driver produces a modulated drive signal 108 having modulation characteristics substantially matching the input signal. In response to receiving modulated drive signal 108, each VCSEL 102n generates a respective optical signal 110n comprising a modulated laser beam that impinges on a frontside of lens 112. Upon passing through the lens, the optical signals are directed toward an input end 114 of a multimode fiber segment 116. As the optical signals pass though the fiber, various modes are excited and the signals are combined, resulting in a mode-scrambled optical signal 118 that is emitted from an output end 120 of the fiber.

In general, the VCSELs 102n in VCSEL array 104 will be arrayed in an N×1, N×N, or N×M configuration. Typically, VCSEL arrays are manufactured in a process that is somewhat akin to semiconductor manufacturing, using very controlled environments and process operations. As such, the VCSELs in the array will typically produce laser beams having similar characteristics, such as power output and wavelength.

Generally, in accordance with one embodiment of the invention, VCSELs 102n will be driven using a common modulated drive signal. Depending on how the VCSEL array is configured, the drive signal may comprise a single input that is then distributed to each VCSEL through internal circuitry, or the drive signal may comprise a plurality of parallel signals addressed to respective VCSELs. As a result, VCSELs 102n will produce synchronized optical signals having similar wavelengths $\lambda_1$. For example, typical wavelengths for $\lambda_1$ include any of the following regions: 785 nm (e.g., 782, 785, 786, 790 nm), 850 nm (e.g., 845, 848, 850, 855), 980 nm, 1550 nm. Accordingly, since each of optical signals 110n are generated in response to a common drive signal and are at approximately the same wavelength, these optical signals comprise redundant signals that are combined into a single optical signal having a power level that is substantially the sum of the power levels of the individual signals alone. Thus, one benefit of using such combined redundant signals is that it enables the link distances between FSO terminals to be increased as a result of the increased power level in the combined signal. Another aspect of the redundancy configuration is that it enables a single optical signal to fail without having the link fail.

A further advantage of using a VCSEL array includes the fact that all the lasers in the array are incoherent with respect to each other. Not only that, but they have wavelengths that are different enough from each other to produce an energy distribution at the exit of optical fibers which do not overlap with the distribution due to the other lasers. The fact that the lasers are not coherent means that there is no interference mixing between lasers. The result is that the light pattern exiting the fiber is less "grainy," and is much more similar to light from an incoherent light source such as an LED, but without the speed limitations inherent with LED sources.

Figure 2:
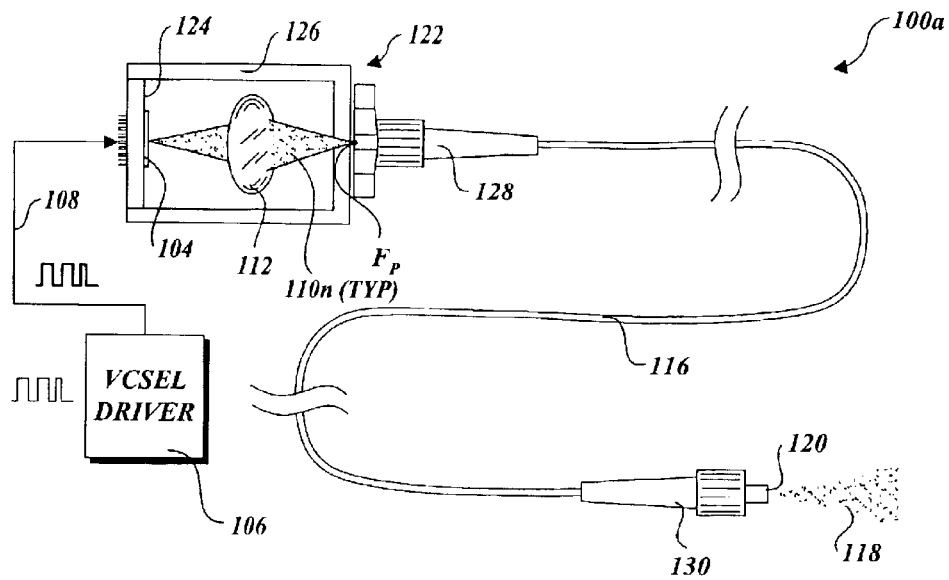
FIG. 2 is a schematic drawing of the apparatus of FIG. 1, wherein further details are shown.

Details of a mode-scrambled optical signal generator 100a that includes a VCSEL-based optical signal source 122 are shown in FIG. 2. (It is noted that many details of the configuration illustrated in FIG. 2 are exaggerated for clarity, and that VCSEL-based optical signal source 122 is not drawn to scale.) The VCSEL-based optical signal source includes a monolithic VCSEL array 104 mounted to an inside face 124 of a housing 126. A lens 112 is also mounted within housing 126 (mounting details not shown). A fiber mount 128 used to hold and input end portion of fiber segment 116 is coupled to the opposite end of the housing, whereby input end 114 of the fiber segment is positioned to receive respective optical signals 110n. As further illustrated, a mode-scrambled optical signal 118 exits output end 120, which is held by a fiber mount 130.

In another embodiment that is not illustrated, the monolithic VCSEL array is coupled to a lens using an adhesive, while the lens, in turn, is coupled to the input end of the fiber using the adhesive. Do to the manufacturing quality and repeatability of monolithic VCSEL arrays, these components may be coupled together with adhesives using a repeatable process, whereby it is not necessary to dynamically align the components to produce optimal optical signal launch conditions.

Figure 3:
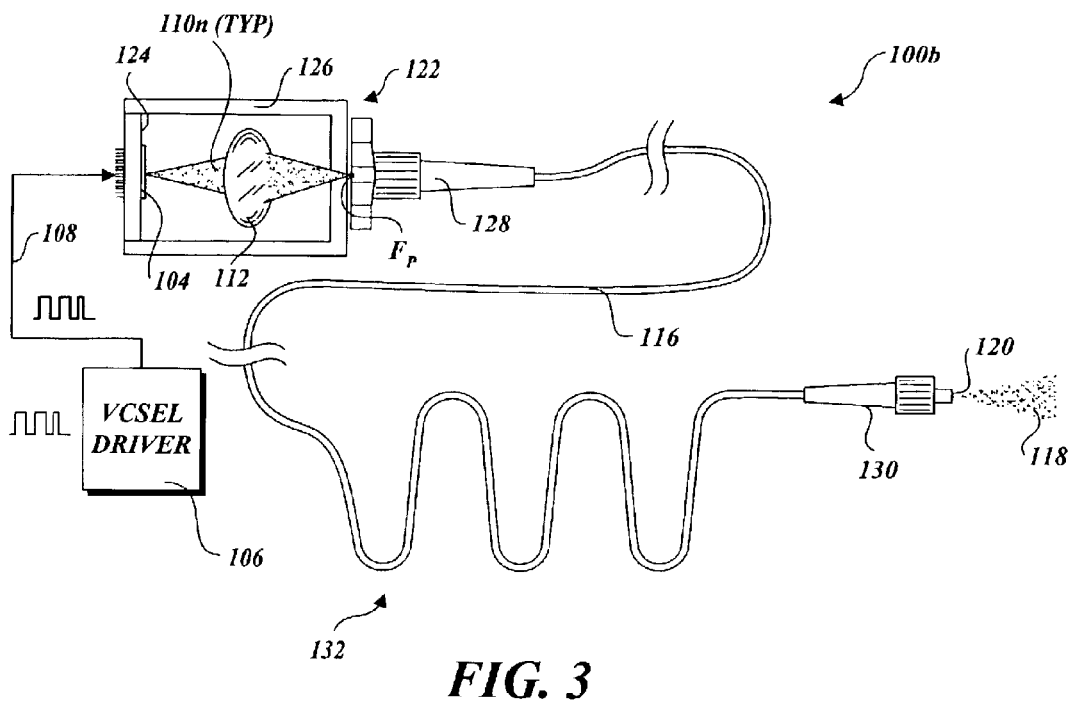
FIG. 3 is a schematic drawing illustrating a variant of the apparatus of FIGS. 1 and 2, wherein a portion of multimode fiber segment is configured in a series of alternating loops in accordance with one embodiment of the invention.

An embodiment of a mode-scrambled optical signal generator 100b, which is a variant of mode-scrambled optical signal generator 100a, is shown in FIG. 3. In this embodiment, a portion of fiber segment 116 is configured in a series of alternating loops 132. Experimental results have shown that the use of such alternating loops improves the mode scrambling of a mode-scrambled optical signal in which the outer portions of the numerical apertures of the signal are more completely filled.

Figure 4:
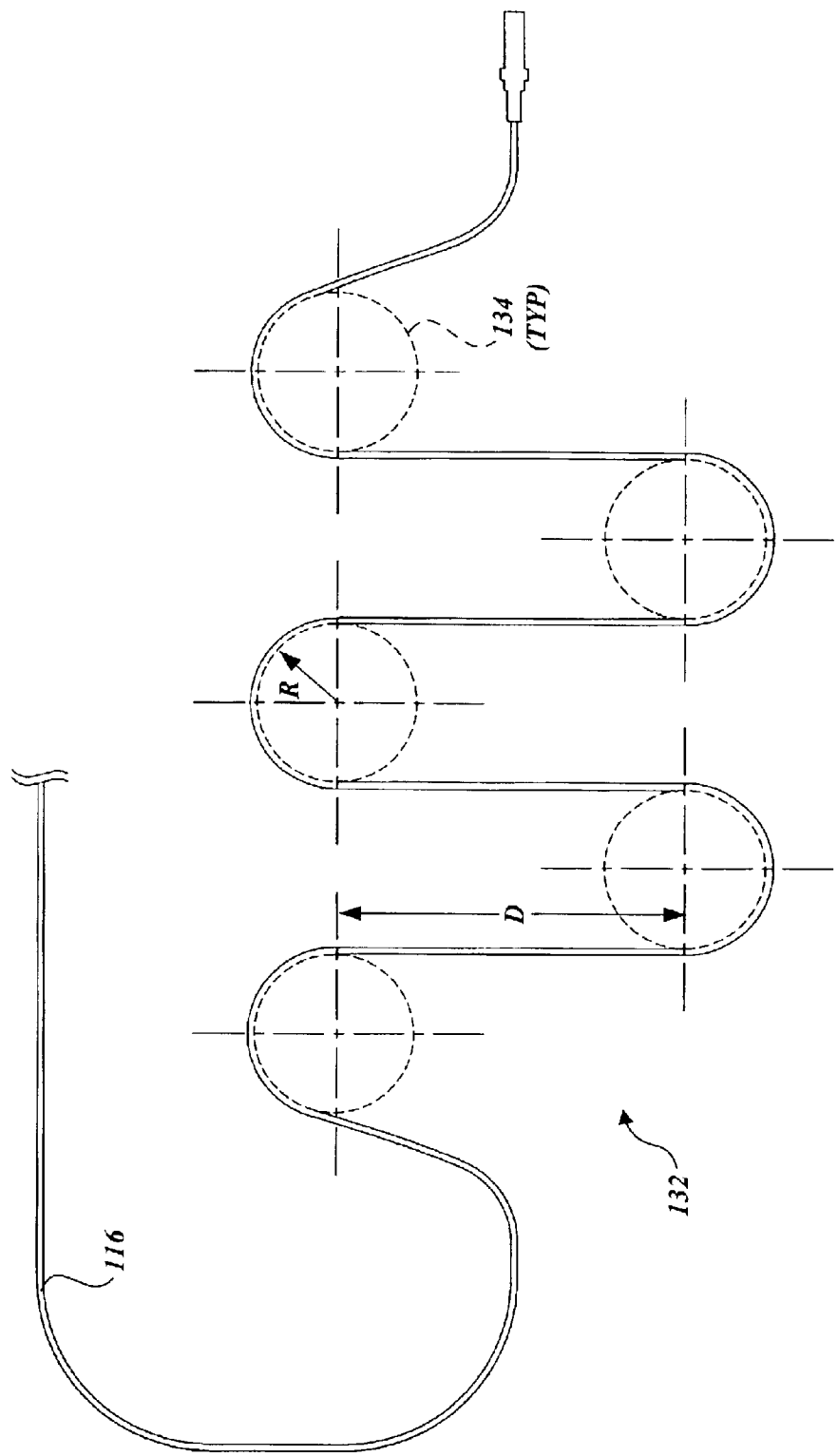
FIG. 4 is a schematic detail drawing illustrating further details of the series of alternating loops in accordance with one embodiment of the invention.

Details of alternating loops 132 in accordance with one embodiment are shown in FIG. 4. In this embodiment, the alternating loops may be formed by wrapping a portion of fiber segment 116 around a plurality of rods 134 in an alternating manner. In general, the radius R of the loops should be large enough to not cause damage to the fiber. In one embodiment, the rods have a diameter of about ½ inch—in general, the actual diameter for a typical implementation will depend on the fiber being used. Additionally, the horizontal distance D between adjacent rods is generally not critical.

Figure 5:
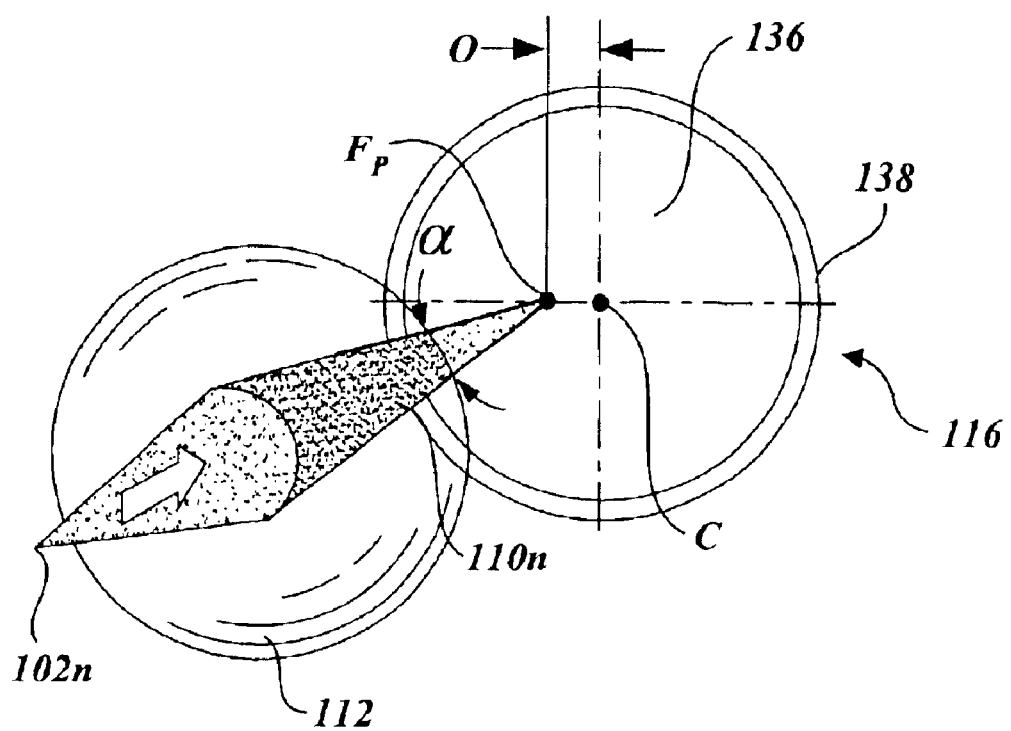
FIG. 5 is a schematic diagram illustrating details of an offset launch condition wherein a modulated laser beam is directed toward an input end of a multimode fiber core at an offset from the center of the multimode fiber core.

In accordance with one aspect of the invention, the various components in VCSEL-based optical signal source 122 are configured so as to produce an offset-launch condition for at least a portion of optical signals 110n. As shown in FIG. 5, VCSEL array 104 and lens 112 are configured in a manner that results in each optical beam 110n being directed toward a focal point $F_p$ that is substantially coincident with the end of a fiber core 136 of multimode fiber segment 116. Typically, the focal points $F_p$ for a least a portion of the optical beams 110n will be offset from a center C of the fiber core by a variety of different offset distances O. This produces an offset-launched optical signal that is optically-coupled into the input end of the fiber core. In one embodiment, lens 112 is configured such that a convergence angle $\alpha$ of optical beam 110n substantially matches the numerical aperture of fiber core 122. Furthermore, in addition to using a single lens to obtain the offset-launch condition, as illustrated, a combination of lenses and other optical components, such as mirrors, may also be used to achieve similar results.

As further depicted in FIG. 5, fiber core 136 is surrounded by cladding 138. In typical fibers, the fiber cladding is generally surrounded by a protective jacket, made of materials such as polymers. For illustrative purposes, the fiber core, cladding, and protective jacket are shown as a single structure in several of the Figures contained herein for clarity. In other Figures, the protective jacket is not shown for clarity.

In one embodiment, fiber segment 116 comprises a step-index (SI) multimode fiber core having a 200 micrometer (micron or $\mu$m) diameter. Alternately, other multimode fibers may be used as well, including fibers having 300 and 400 $\mu$m cores. In a practical device the lenses used to couple the VCSEL laser light into the fiber can be chosen to match the VCSEL laser divergence with the NA of the fiber. In this way VCSEL arrays of different size may be efficiently coupled into a variety of fiber types.

In one embodiment, a portion of the VCSELs in the VCSEL arrays may be used as selective spares. For example, if one of the active VCSELs in the array fails, a spare VCSEL may be activated to take its place. (Generally, this will require the use of a VCSEL array that supports individual control of each VCSEL, wherein the VCSELs receive respective drive signals and may be individually addressed, as discussed above.)

Advantages of Launching a Mode-scrambled Optical Signal with a Substantially-filled Numerical Aperture As discussed above, the embodiments of the invention create a mode-scrambled signal with a substantially-filled numerical aperture. The numerical aperture (NA) is basically a measure of the light-gathering ability of the optical fiber and the ease in coupling light into the optical fiber. The numerical aperture is defined as the sine of the largest angle an incident light beam can have for total internal reflection in the core, and is characterized for a step index fiber by $$NA = \sin(\theta) = \sqrt{(n_1)^2 - (n_2)^2}$$

where NA is the numerical aperture, $\theta$ is the half angle of the incident light beam, $n_1$, is the index of refraction for the optical fiber core, and $n_2$ is the index of refraction for the optical fiber cladding.

Light rays launched outside the angle specified by the optical fiber's numerical aperture excite optical fiber modes. The greater the ratio of core index of refraction to the cladding index of refraction results in a larger numerical aperture.

Figure 6A:
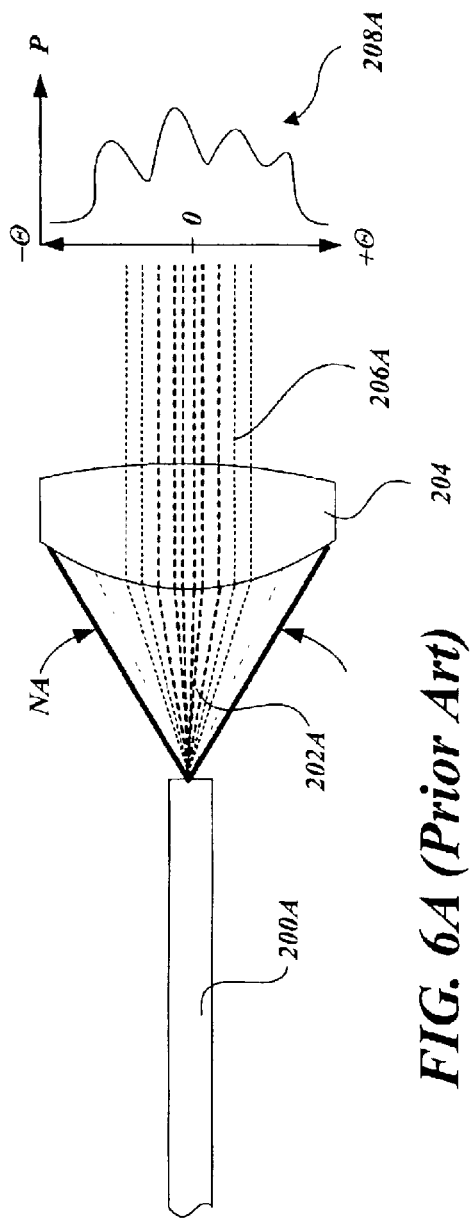
FIGS. 6A and 6B respectively show a mode-scrambled optical signal produced by using a prior art mode-scrambling technique that has an under-filled numerical aperture, and a mode-scrambled optical signal produced by an embodiment of the present invention in which the numerical aperture is substantially filled.
Figure 6B:
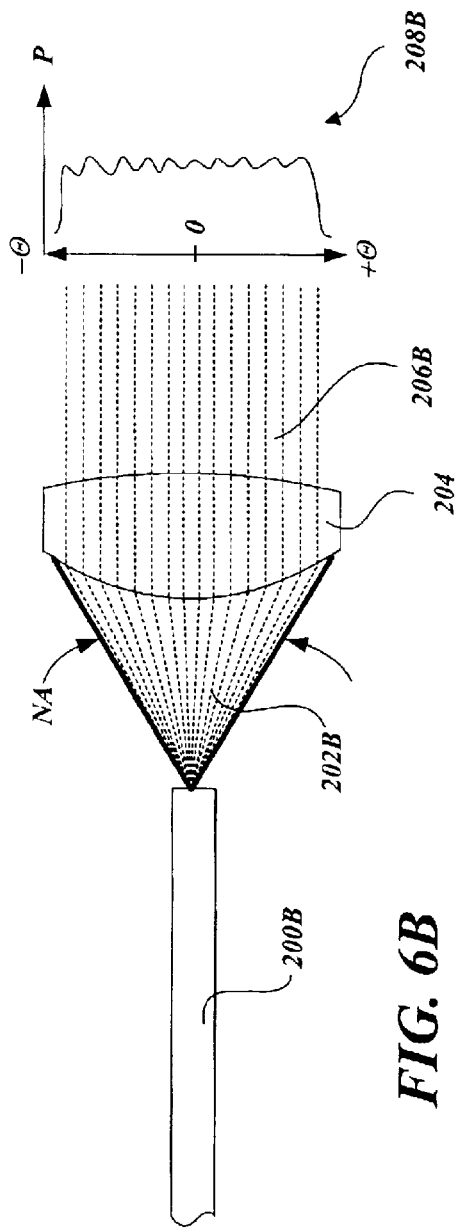

Launch conditions corresponding to an under-filled and substantially-filled numerical aperture are illustrated in FIGS. 6A and 6B, respectively, wherein a respective optical signal 202A and 202B are launched from a segment of optical fiber 200. As the optical signals impinge upon a collimating lens 204, the signals are collimated into respective transmitted signals 206A and 206B, which are received by a FSO terminal (not shown) to complete the link. In these Figures, the dashed lines illustrate relative intensity values, wherein the heavier the line, the greater the intensity.

Figure 7A:
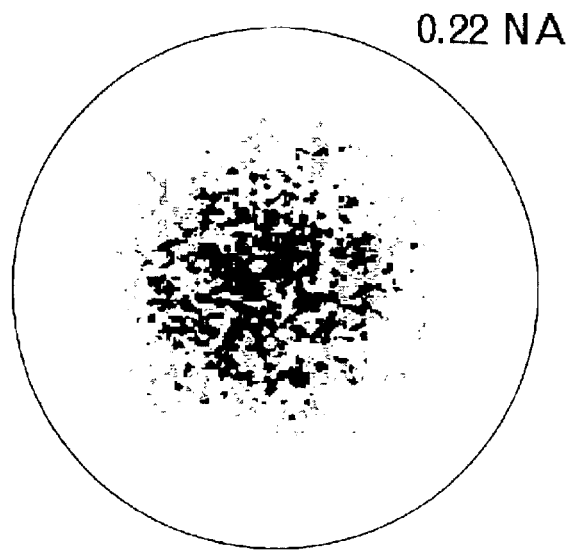
FIGS. 7A and 7B respectively show representations of intensity patterns corresponding to a mode-scrambled signal produced using a conventional mode-scrambling technique, and a mode-scrambled signal produced using a mode-scrambling technique in accordance with one embodiment of the invention.
Figure 7B:
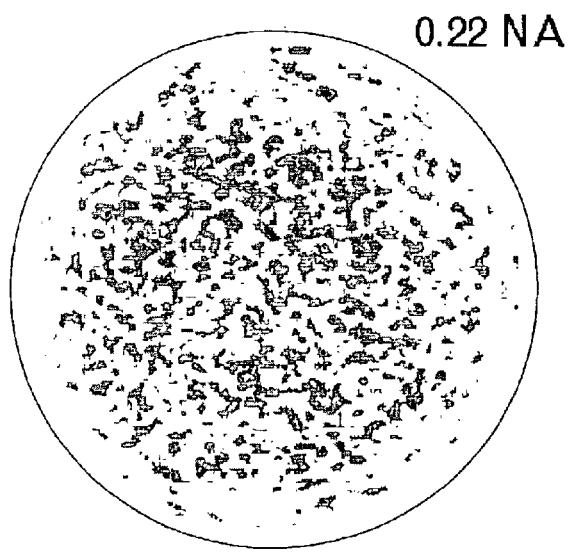

At the right hand of each figure is an intensity distribution diagram that depicts the relative power (intensity) distribution P of the optical signal vs. angle $\Theta$ relative to a centerline of the signal. In reality, the actual intensity distribution comprises a three-dimensional profile, as shown in FIGS. 7A and 7B; the two-dimensional profiles shown in FIGS. 6A and 6B are commonly used in these types of diagrams.

Generally, the mode scrambled optical signals produced by prior art techniques are characterized by an uneven intensity distribution with noticeable peaks and valleys, such as illustrated by an intensity distribution 208A. Furthermore, the power is concentrated toward the center of the transmission signal. In contrast, the signal intensity profile produced by embodiments of the present invention, as illustrated by an intensity distribution 208B, is in the shape of a "top hat," which is a desirable intensity distribution for optical communication. For example, an advantage of the "top hat" intensity distribution is that it allows for more energy to be transmitted out of the transmit aperture than the Gaussian distribution characteristic of a single mode transmission, or large peak and valley profile common to prior art mode-scrambled signals.

Another advantage of launching a mode-scrambled signal with a substantially-filled numerical aperture is that the optical signal is pre-distorted such that effects such as atmospheric scintillation and/or window wave front aberration are small compared to the scrambling generated on the transmitting end. This means that the light beam power distribution at the receiving aperture is more homogenous and the intensity fluctuations caused by atmospheric scintillation and/or window wave front aberration are practically transparent.

Still another advantage of launching a mode-scrambled signal with a substantially-filled numerical aperture is that a more powerful signal can be transmitted without adversely affecting eye safety. For example, the maximum amount of power used for a given optical signal due to eye safety concerns will generally be limited as a function of the peak intensity of the signal, rather than the integrated intensity of the signal. Accordingly, the maximum power used for conventional mode-scrambled signals will be limited by their peak intensities, which are much more pronounced (relative to an average intensity) than that found in the top-hat profile produced by embodiments of the present invention. As a result, the present invention enables more powerful optical signals to be transmitted, while still adhering to safety limitations.

Experimental results have demonstrated the embodiments of the invention discussed above produce mode-scrambled signals with significant improvements in intensity distribution when compared with the prior art. Representations of test results comparing one such conventional mode-scrambling technique with a mode-scrambling technique in accordance with one embodiment of the invention are shown in FIGS. 7A and 7B, respectively. The conventional mode-scrambling embodiment used a segment of 62.5 μm fiber spliced into a segment of 200 μm fiber using a convention launch condition (i.e., the laser optical signal was directed toward the center of the free end of the 62.5 μm fiber). In contrast, in accordance with aspects of the invention, the results represented by the intensity pattern of FIG. 7B is illustrative of a mode-scrambled optical signal produced by VCSEL-based optical signal generator that employs the principles of the invention discussed herein.

To obtain the intensity patterns, the respective mode-scrambled optical signals were emitted from the free ends of 200 μm SI fiber and directed at a white wall. An Electrophysics digital infrared camera was then used to photograph the intensity pattern formed on the wall. The infrared images, which comprise differing intensities of red on a substantially black background, where then digitally inverted and converted into 16-color images. The colors in the 16-color images where then remapped into shades of gray and black to produce the images shown in FIGS. 7A and 7B, wherein the darker the region, the higher the intensity.

In general, the results illustrated in FIG. 7A and representative of intensity patterns obtained during testing of various prior art mode-scrambler configurations. For example, prior art configurations that have been tested include using a Newport MF-1 mode scrambler to apply light, medium, and heavy loads to produce various levels of micro-bending in a 62.5 μm fiber, using a 2 meter section of 62.5 μm GI fiber spliced into a 2 meter section of 50 μm fiber SI fiber, which is then spliced into another 2 meter section of 62.5 μm fiber GI fiber, and using a Siecor offset splice mode scrambler. In each instance, the intensity distribution corresponded to a condition in which the numerical aperture was only partially filled, with uneven intensity distribution.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and Figures are accordingly to be regarded as illustrative rather than restrictive. Furthermore, it is not intended that the scope of the invention in any way be limited by the above description, but instead be determined entirely by reference to the claims that follow.

What is claimed is:

1. An apparatus for generating a mode-scrambled free space optical signal, comprising:

a segment of multimode fiber, having an input end and an output end;

a vertical cavity surface-emitting lasers (VCSEL) driver, to generate a modulated drive signal in response to a modulated data stream received as an input to the VCSEL driver;

an array of VCSELs, each active VCSEL in the array to emit a respective optical signal comprising a modulated laser beam in response to being driven by the modulated drive signal; and means for optically coupling the respective optical signals into the input end of the multimode fiber, wherein, as the respective optical signals pass through the segment of multimode fiber they are combined to produce a mode-scrambled free-space optical signal that is emitted from the output end of the segment.

2. The apparatus of claim 1, wherein a portion of the segment of multimode fiber is configured in a series of alternating loops.

3. The apparatus of claim 1, wherein the mode-scrambled free-space optical signal has a substantially-filled numerical aperture.

4. The apparatus of claim 1, wherein the segment of multimode fiber comprises a 200 micron step-index (SI) core.

5. The apparatus of claim 1, wherein at least a portion of the respective optical signals are optically coupled into the input end of the segment of multimode fiber so as to produce an offset-launch condition wherein an optical signal is received at a location on the input end of the segment that is offset from a center of the multimode fiber at the input end.

6. The apparatus of claim 1, wherein the means for optically coupling the respective optical signals into the input end of the segment of multimode fiber comprises a lens.

7. The apparatus of claim 6, further comprising a housing to which each of the array of VCSELs and the lens are fixedly mounted, and to which the input end of the segment of multimode fiber is operatively coupled.

8. The apparatus of claim 6, wherein the array of VCSELs is coupled to the lens using an adhesive, and the lens is coupled to the input end of the segment of multimode fiber using an adhesive.

9. The apparatus of claim 1, wherein individual VCSELs in the array can be selectively activated, and wherein a first portion of the VCSELs are active upon operation of the apparatus, and a second portion of the VCSELs comprise reserve VCSELs that may be selectively activated to replace any active VCSELs that fail.

10. The apparatus of claim 1, wherein the array of VCSELs comprises a monolithic component.

11. The apparatus of claim 1, wherein the respective optical signals are optically coupled into the input end of the segment of multimode fiber at an angle of convergence that substantially matches a numerical aperture of the multimode fiber.

12. The apparatus of claim 1, wherein the mode-scrambled free-space optical signal has a two-dimensional intensity-distribution profile resembling a top hat, wherein the peak signal intensity in the distribution does not substantially differ from an average signal intensity in the top hat portion of the profile.

13. A method for generating a mode-scrambled free-space optical signal, comprising:

generating a plurality of optical signals using an array of vertical cavity surface-emitting lasers (VCSELs), each active VCSEL in the array producing a respective modulated optical signal having data modulated thereon;

optically coupling the plurality of modulated optical signals into an input end of a segment of multimode fiber;

passing the plurality of modulated optical signals through the segment of multimode fiber, said plurality of modulated optical signals being combined into a mode-scrambled optical signal as they pass through the fiber to produce a mode-scrambled optical signal; and emitting the mode-scrambled optical signal from an output end of the segment of multimode fiber to produce a mode-scrambled free-space optical signal.

14. The method of claim 13, wherein a portion of the segment of multimode fiber is configured in a series of alternating loops.

15. The method of claim 13, wherein the mode-scrambled free-space optical signal has a substantially-filled numerical aperture.

16. The method of claim 13, wherein the segment of multimode fiber comprises a 200 micron step-index (SI) core.

17. The method of claim 13, wherein at least a portion of the plurality of modulated optical signals are optically coupled into the input end of the segment of multimode fiber so as to produce an offset-launch condition wherein a modulated optical signal is received at a location on the input end that is offset from a center of the multimode fiber at the input end.

18. The method of claim 13, wherein individual VCSELs in the array can be selectively activated, the method further comprising:

activating a first portion of the VCSELs in the array to generate respective modulated optical signals;

initially de-activating a second portion of the VCSELs in the array;

determining that an activated VCSEL has failed, and in response thereto;

activating a VCSEL from the second portion of the VCSELs.

19. The method of claim 13, wherein the array of VCSELs comprises a monolithic component.

20. The method of claim 13, wherein the respective modulated optical signals are optically coupled into the input end of the segment of multimode fiber at an angle of convergence that substantially matches a numerical aperture of the multimode fiber.

21. The method of claim 13, wherein the mode-scrambled free-space optical signal has a two-dimensional intensity-distribution profile resembling a top hat, wherein the peak signal intensity in the distribution does not substantially differ from an average signal intensity in the top hat portion of the profile.

* * * * *